United States Patent Office 3,467,691
Patented Sept. 16, 1969

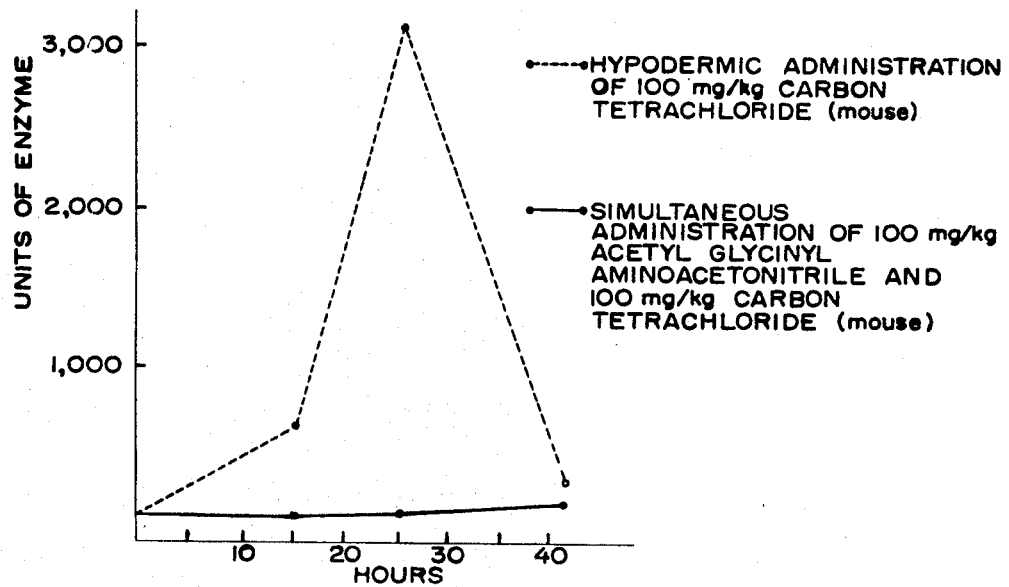
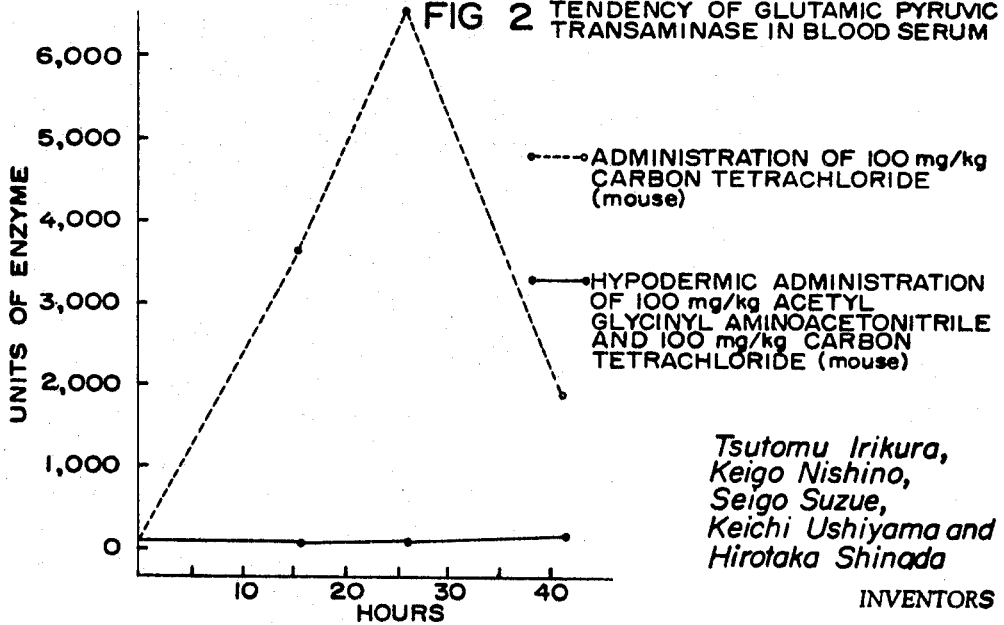

3,467,691
N-(N-ACYLAMINOACYL)-AMINOACETONITRILES
Tsutomu Irikura, 5 1-chome, Wakagi-cho, Itabashi-ku;
Keigo Nishino, 25 5-chome, Shimo, Kita-ku; Seigo
Suzue, 35 1-chome, Minami-Senju, Arakawa-ku; and
Keichi Ushiyama, 32 3-chome, Ukima-cho, Kita-ku, all
of Tokyo, Japan; and Hirotaka Shinada, 147 2-chome,
Kita-machi, Saitama-ken, Kawaguchi-shi, Japan
Filed Apr. 20, 1965, Ser. No. 449,472
Claims priority, application Japan, Apr. 22, 1964,
39/22,575
Int. Cl. C07c *121/44, 103/30*
U.S. Cl. 260—465        10 Claims

ABSTRACT OF THE DISCLOSURE

Compounds that are N-(N-acylaminoacyl)-aminoacetonitriles of the formula

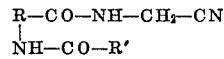

in which

is the residue of

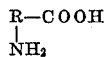

representing acids such as glycine, α-alanine, β-alanine, α-aminobutyric acid, α-aminoisobutyric acid, valine, leucine, isoleucine, norleucine, methionine, lysine, tryptophane, β-, α-, γ-, ε-aminocaproic acids, aspartic acid, phenylalanine, tyrosine, phenyl glycine, γ-aminovaleric acid, etc. and R—CO represents an acyl radical, R' representing a straight or branched chain alkyl radical or an aromatic radical have been found to be useful in the treatment of liver diseases while having less undesirable side effects than the parent aminoacid-aminoacetonitriles.

---

The present invention relates to derivatives of N-(N-acylaminoacyl)-aminoacetonitrile of the formula:

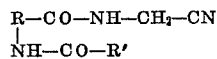

in which

is the residue of

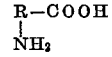

representing amino acids such as glycine, α-alanine, β-alanine, α-aminobutyric acid, α-aminoisobutyric acid, valine, leucine, isoleucine, norleucine, methionine, lysine, tryptophane, β-, α-, δ-, ε-aminocaproic acids, aspartic acid, phenylalanine, thyrosine, phenyl glycine, δ-amino-valeric acid, etc. and R'—CO represents an acyl radical, R' representing a straight or branched chain alkyl radical or an aromatic radical.

The present invention is based on our discovery that secondary effects of amino acid-aminoacetonitrile can be reduced without lowering its liver protecting effects by acylation of the amino radical thereof.

Some of the secondary effects of aminoacid-aminoacetonitrile will be described in more detail hereinafter.

Aminoacetonitrile, which is the starting substance for aminoacid-aminoacetonitrile, not only has such strong medical effects that it completely prevents liver damage caused by liver damaging substances such as carbon tetrachloride, bromobenzene, thioacetoamide, etc., but it also is capable of regenerating the liver and of preventing liver cirrhosis. But on the other hand it has harmful pharmacodynamical effects on the vermiculation of intestines and strong influence both on the heart rate and the blood pressure, so that this substance has no value as medicine.

The aforementioned aminoacid-aminoacetonitrile has the same degree of liver protecting effect as aminoacetonitrile, and it has become possible to reduce its pharmacodynamical virulence to less than one-tenth and thus it has become useful as medicine.

However some interesting facts have been found from biochemical studies on these substances.

Namely, it has been found that so-called lathyrogenic substance present in sweet pea causes denaturation (liquescence) of acid muco polysaccharide which is a component of young animal's cartilage, thus causing denaturation of the cartilage and, in addition, suppressing the propagation of fibrinorous cells. It has been also known that aminoacetonitrile is one of the strongest substance in respect of lathyrogenic activities.

The present inventors have conducted studies for overcoming the correlation among liver protecting activity, pharmaco-dynamic activity, and lathyrogenic activity, and have now succeeded in breaking off the correlation and applying only the useful activities thereof to medical treatment of human diseases.

The above developments are tabulated as follows:

| | Liver protecting and antidotal activity | Suppressing effect on intestine vermiculation | Lathyrogenic activity |
|---|---|---|---|
| Aminoacetonitrile | Strong | Strong | Very strong. |
| Aminoacid-aminoacetonitrile | Equal to aminoacetonitrile | 1/10 of aminoacetonitrile | Half of aminoacetonitrile. |
| Acyl aminoacid aminoacetonitrile of present invention. | ——do—— | Less than 1/10 of aminoacetonitrile. | Less than 1/4 of aminoacetonitrile. |

It should be noted that liver cirrhosis, namely fibrination cannot be suppressed by complete removal of lathyrogenic activity and thus in case of giving priority to the liver function (for example in cases where it is desired to prevent liver disorder caused by inspirated anesthesia, blood transfusion and so on), a lower lathyrogenic activity is advantageous. This means the substance of the present invention is more useful in this point. Meanwhile in case of preventing liver cirrhosis tendency, aminoacid-aminoacetonitrile is more advantageous.

The preventing effects, on liver disorder caused by carbon tetrachloride, of acetyl glycinyl aminoacetonitrile, the simplest one of the substances of the present invention, will be described by way of example, referring to the accompanying drawings.

FIG. 1 and FIG. 2 show the preventing effects, on liver disorder caused by carbon tetrachloride, of a representative substance of the present invention, acetyl glycinyl aminoacetonitrile.

The two kinds of transaminase shown in FIG. 1 and FIG. 2 will be released in a large amount into the blood serum when the parenchyma of the liver is broken. On the other hand it has been proved by various experiments that the absence of these enzymes in the blood serum indicates no disorder in the parenchyma of the liver, and thus this has been adopted as a most reliable method for the diagnosis of human liver disease.

It can be seen from FIG. 1 and FIG. 2 that acetyl glycinyl aminoacetonitrile completely prevents the liver disorder which otherwise is caused by 100 mg./kg. of carbon tetrachloride.

The substances to which the present invention relates are synthesized to N-(N-acyl aminoacid) aminoacetonitrile by acylating aminoacid-aminoacetonitrile with a suitable acylating agent, such as, for example, acid anhydride or acid halide (acid ester) etc.

This may be shown by Equation 1 as follows:

$$\begin{array}{c} R-CONH\cdot CH_2-NC \\ | \\ NH_2 \end{array} + \begin{array}{c} R'-CO \\ \diagdown \\ \diagup \\ R'-CO \end{array} O\text{(or } R'CO-X) \longrightarrow$$

$$\begin{array}{c} R-CO\cdot NH\cdot CH_2-CN \\ | \\ NH-CO-R' \end{array}$$

(1)

in which $$\begin{array}{c} R-CO \\ | \\ NH- \end{array}$$

is the residue of $$\begin{array}{c} R-COOH \\ | \\ NH_2 \end{array}$$

representing amino acid, R' represents a straight or branched chain alkyl, or an aromatic radical and X represents halogen.

When acid anhydride is used as the acylating agent, the amino radical is easily acylated by reaction of aminoacid-aminoacetonitrile (or its acetate) with acid anhydride such as acetic anhydride, propionic anhydride, butyric anhydride, isobutyric anhydride and so on, for example, without a solvent or in a suitable solvent (preferably aqueous solution), so that the desired acyl aminoacid-aminoacetonitrile, N-(N-acetyl glycyl)-aminoacetonitrile, for example, is obtained.

When an acid halide, such as acetyl chloride, acetyl bromide, propionyl chloride, butyric chloride, benzoyl chloride etc., is used as the acylating agent, it is desirable that a neutralizing agent, such as sodium bicarbonate, sodium carbonate, potassium carbonate, pyridine, triethylamine, etc. be concomitantly used, and the reaction may be carried out in an aqueous solution or in an organic solvent (ether, benzene, alcohol, pyridine, for example). It is particularly advantageous in this case that the reaction takes place in an aqueous solution at a temperature between 0°–25° C.

The present invention is hereinafter described in more detail setting forth presently preferred examples.

Aminoacid-acetonitrile [II] or a derivative thereof, which is the starting material for the present invention, is produced by a method, for example, in which acid amide synthesized from phthaloyl amino acid and aminoacetonitrile, having the general Formula III, is subjected to the action of hydrazine or its hydrate:

[Structure III with NH₂·NH₂·H₂O]

$$H_2N-RCONH\cdot CH_2\cdot CN \qquad [II]$$

The compound of Formula III can be obtained by combining a reactive derivative of phthaloyl amino acid, such as its halide, with aminoacetonitrile. This is shown by the following reaction scheme:

[Phthalimide structure: N—RCOHal·H₂NCH₂CN]

↓

[Phthalimide structure: N—RCONHCH₂CN]  [III]

EXAMPLE 1

N-(N-acetyl glycyl)-aminoacetonitrile 1 g. (gram) of N-glycyl-aminoacetonitrile (or its acetate) is dissolved in 5 cc. (cubic centimeters) of water, and 1.5 cc. of acetic anhydride is added at one time at room temperature (20 to 30° C.) with stirring. After 15 minutes, 1.5 cc. of acetic anhydride is again added with stirring for 30 minutes thereafter, and then condensation under diminished pressure is effected. When the resultant crystals are subjected to recrystallization from ethanol, 0.8 g. of fine plate crystals are obtained. The melting point of this substance is 157°–159° C.

*Analysis.*—Calculated: C, 46.44; H, 5.85; N, 27.08. Found: C, 46.41; H, 5.67; N, 27.85.

Glycyl-aminoacetonitrile used as starting material in this example can be produced as follows:

5 g. of aminoacetonitrile sulphate is dissolved in 100 cc. of water, with addition of 12 g. of sodium bicarbonate. The resulting solution is cooled to 5° C. and 50 cc. of dioxan solution of 10 g. of phthaloyl glycyl chloride is dropped thereinto with stirring for a period of 30 minutes, during which period crystals precipitate. Then stirring is continued at 5° C. for 2 hours and crystals are collected by filtration, washed with water and dried.

White needle crystals are obtained by recrystallization from acetonitrile. The melting point of this substance is between 245° C. and 246° C.

*Analysis.*—Calculated for $C_{12}H_9O_3N_3$. N, 17.28. Found: N, 17.57.

Then 7 g. of phthaloyl glycyl aminoacetonitrile is added to 50 cc. of ethyl alcohol solution of 18 g. of 80% hydrazine hydrate and heated for 1.5 hours to distil off ethyl alcohol under diminished pressure. The residue is added to 70 cc. of aqueous solution of 75 g. of conc. hydrochloric acid and the solution is stirred for 5 minutes and cooled. Then undissolved crystals are removed and when the solution is condensed under 40° C., syrup-like residue is obtained.

The residue is dissolved in the least possible amount of methanol with addition of ethyl alcohol. When this solution is left in a refrigerator, 3 g. of white crystal of the object substance is obtained. The melting point of the substance is between 179°–183° C.

*Analysis.*—$C_4H_{30}N_3Cl$.—Calculated: N, 28.05. Found: N, 28.87.

EXAMPLE 2

N-(N-acetyl glycyl)-aminoacetonitrile 1 g. of glycyl-aminoacetonitrile acetate is dissolved in 5 cc. of water. 2 g. of sodium bicarbonate is added and then 1 cc. of ether solution of 0.5 g. of acetylchlorido is dropped into the solution at a temperature between 0° and 5° C. while stirring and cooling the solution with ice water. Stirring is continued at a temperature between 0° and 5° C. for 30 minutes thereafter, and further stirring is continued at room temperature for one hour. Then the reaction solution is filtered and when the filtrate is subjected to condensation under diminished pressure below 40° C., there are left crystals.

These crystals are extracted with hot ethanol, and undissolved substances are filtered off. When the filtrate is cooled, white plate crystals are obtained. The melting point of this substance is 157°–159° C. and the amount obtained is 0.6 g. When this substance is mixed with that obtained by Example 1, no lowering of the melting point is observed.

EXAMPLE 3

N-(N-benzoyl-glycyl)-aminoacetonitrile 1.1 g. of N-glycyl-aminoacetonitrile acetate is dissolved in 10 cc. of water, 1.7 g. of sodium bicarbonate is added to the solution and then the solution is cooled to 0°–5° C. by ice. Then 0.9 g. of benzoyl chloride is added, whereupon crystals precipitate from the solution. After four hours the precipitating crystals are collected by filtration, washed with cold water and when recrystallized with ethanol, 1.2 g. of white needle crystals are obtained. The melting point of this substance is 186°–188° C.

*Analysis.*—Calculated: C, 60.82; H, 5.10; N, 19.35. Found: C, 60.46; H, 4.86; N, 19.53.

EXAMPLE 4

N-(N-acetyl-valyl)-aminoacetonitrile 500 mg. (milligrams) of N-valyl-aminoacetonitrile acetate is dissolved in 5 cc. of water and the solution is treated with two-time addition of 0.75 cc. of acetic anhydride in a similar way as in Example 1. The resulting crystals are recrystallized from hot water and 420 mg. of white needle crystals having melting point between 187° and 188° C. are obtained. Infrared analysis (wave number cm.$^{-1}$):

$\nu$ NH 3380, 3020; $\nu$ C=O 1670, 1650
$\delta$ NH 1530, 1550; $\delta_3$ CH$_3$ 1380
$\delta$ (CH$_3$)$_2$CH—: 1160

In this way the crystals are determined to be the object substance.

EXAMPLE 5

N-(N-benzoyl-valyl)-aminoacetonitrile 4.5 g. of the object substance is obtained from 0.5 g. of N-valyl aminoacetonitrile acetate in a similar way as in Example 3. White needle crystals which are recrystallized from ethanol show a melting point between 225° and 227° C. (by capillary). When determining the melting point by micro-analysis the crsytals begin to sublimate gradually at about 200° C. and show a melting point of 234° C.

*Analysis.*—Calculated: C, 64.81; H, 6.61; N, 16.21. Found: C, 64.68; H, 6.41; N, 16.54.

EXAMPLE 6

N-(N-benzoyl-leucyl)-aminoacetonitrile 200 mg. (0.00087 mole) of N-leucyl-aminoacetonitrile acetate is dissolved in 2 cc. of water with addition of 160 mg. (0.002 mole) of sodium bicarbonate, and then 1 cc. of ether solution of 210 mg. of benzoyl chloride is added at one time. When strong stirring is applied, crystals precipitate soon. Then 3 cc. of ether is added and after 30 minute stirring, crystals are collected by filtration and recrystallized from water-alcohol. White needle crystals having a melting point between 158° and 159° C. are obtained.

*Analysis.*—Calculated: C, 65.91; H, 7.01; N, 15.37. Found: C, 66.38; H, 6.91; N, 15.49.

EXAMPLE 7

N-(N-benzoyl-α-alanyl)-aminoacetonitrile 200 mg. of N-α-alanyl aminoacetonitrile is dissolved in 2 cc. of water, 200 mg. of sodium bicarbonate is added thereto, and further 200 mg. of benzoyl chloride dissolved in 3 cc. of ether is added at one time. Then strong stirring is applied at room temperature. After standing overnight, the resulting crystals are collected by filtration, and recrystallized from hot water (with active carbon), thus obtaining 210 mg. of white needle crystals.

*Analysis.*—Calculated: C, 62.32; H, 5.67; N, 18.17. Found: C, 62.24; H, 5.37; N, 18.61.

EXAMPLE 8

N-(N-acetyl-α-alanyl)-aminoacetonitrile 100 mg. of N-α-alanyl aminoacetonitrile acetate and 0.15 cc. of acetic anhydride are caused to react and treated in a similar way as shown in Example 1 to obtain the object substance. Recrystallized from isopropyl alcohol, 60 mg. of white needle crystals, having a melting point between 149–150° C. are obtained.

Infrared analysis (cm.$^{-1}$):

NH 3380, 3300,
C=O 1680, 1640
NH 1570, 1540,
CH$_3$ 1380, 1260

Thus the crystals are determined to be the object substance.

EXAMPLE 9

N-[N-(N-benzoyl-ε-amino-caproyl)-glycyl] aminoacetonitrile

Sodium bicarbonate is added to aqueous solution of N-glycyl-aminoacetonitrile acetate, and ether solution of N-benzoyl-ε-amino-caproic acid is added with stirring at 5° C., stirring being continued at the same temperature for 3 hours. Then further stirring is applied at room temperature for 8 hours until the odor of the chloride disappears at room temperature, to obtain crystals. The crystals are recrystallized from alcohol or hot water and white needle crystals having a melting point between 158 and 160° C are obtained.

*Analysis.*—Calculated: N, 16.96. Found: N,17.26.

EXAMPLE 10

White needle crystals of N-(N-propionyl-glycyl)-amino-acetonitrile having a melting point between 159 and 160° C. are obtained similarly, using ethanol as recrystallization solvent.

EXAMPLE 11

White needle crystals of N - (N-n-butyryl - glycol)-amino-acetonitrile (M.P. 129–131° C. are similarly obtained, using ethanol.

EXAMPLE 12

White plate crystals of N-(N-n-caproyl-glycyl)-amino-acetonitrile (M.P. 142–143° C.) are similarly obtained, using ethanol.

EXAMPLE 13

White plate crystals of N-(N-n-heptanoyl-glycyl)-aminoacetonitrile (M.P. 141—141.5° C.) are similarly obtained, using water-ethanol.

EXAMPLE 14

White plate crystals of N-(N-n-caprylyl-glycyl)-amino-acetonitrile (M.P. 146–147° C.) are similarly obtained, using ethanol.

EXAMPLE 15

White needle crystals of N-(N-acetyl-alanyl)-aminoacetonitrile (M.P. 149–150° C. ) are similarly obtained, using isopropyl alcohol.

EXAMPLE 16

White needle crystals of N-(N-benzoyl-alanyl)-aminoacetonitrile (M.P. 168° C) are similarly obtained, using water.

EXAMPLE 17

White needle crystals of N-(N-isobutyryl - alanyl)-aminoacetonitrile (M.P. 165–166° C.) are similarly obtained, using ethanol.

EXAMPLE 18

White needle crystals of N-(N-propionyl-valyl)-aminoacetonitrile (M.P. 184–185° C.) are similarly obtained, using ethanol.

EXAMPLE 19

White needle crystals of N-(N-butyryl-valyl)-aminoacetonitrile (M.P. 172–173° C.) are similarly obtained, using 30% ethanol.

EXAMPLE 20

White needle crystals of N-(N-isobutyryl-valyl)-aminoacetonitrile (M.P. 192–193° C.) are similarly obtained, using ethanol.

EXAMPLE 21

White needle crystals of N-(N-n-caproyl-valyl(-aminoacetonitrile (M.P. 167–168° C.) are similarly obtained, using ethanol.

EXAMPLE 22

White needle crystals of N-(N-n-heptanoyl - valyl)-aminoacetonitrile (M.P. 167–168° C.) are obtained similarly, using ethanol.

EXAMPLE 23

White plate crystals of N-(N-n-caprylyl-valyl)-aminoacetonitrile (M.P. 148–149° C.) are similarly obtained, using water-ethanol.

EXAMPLE 24

White prism crystals of N-(N-acetyl-leucyl)-aminoacetonitrile (M.P. 144–145° C.) are similarly obtained, using acetonitrile.

EXAMPLE 25

White needle crystals of N-(N-propionyl-leucyl)-aminoacetonitrile (M.P. 127–128° C.) are similary obtained, using water.

EXAMPLE 26

White needle crystals of N-(N-isobutyryl - leucyl)-aminoacetonitrile (M.P. 134–135° C. ) are similarly obtained, using water.

EXAMPLE 27

White needle crystals of N-(N-acetyl-β-alanyl)-aminoacetonitrile (M.P. 143–144° C.) are similarly obtained, using ethanol.

EXAMPLE 28

White plate crystals of N-(N-acetyl-ε-aminocaproyl)-aminoacetonitrile (M.P. 103–104° C.) are similarly obtained, using ethyl acetate.

EXAMPLE 29

White needle crystals of N-(N-acetyl-γ-aminocaproyl)-aminoacetonitrile (M.P. 147° C.) are similarly obtained, using ethyl acetate.

EXAMPLE 30

White needle crystals of N-(N-acetyl-δ-aminocaproyl)-aminoacetonitrile (M.P. 88–92° C.) are similarly obtained, using ethyl acetate.

EXAMPLE 31

White leaflet crystals of N-(N-acetyl-γ-aminobutyryl)-aminoacetonitrile (M.P. 94–96° C.) are similarly obtained, using ethyl acetate.

EXAMPLE 32

White needle crystals of N-(N-acetyl-methionyl)-aminoacetonitrile (M.P. 109–111° C.) are similarly obtained, using isopropyl-alcohol.

EXAMPLE 33

White prism crystals of N-(N-acetyl-tryptophyl)-aminoacetonitrile (M.P. 196–197° C.) are similarly obtained, using acetic acid.

EXAMPLE 34

White needle crystals of N-(N-acetyl-asparaginyl)-aminoacetonitrile (M.P. 195–196° C.) are similarly obtained, using water-ethanol.

EXAMPLE 35

White needle crystals of N-(N-i-valeryl-methionyl)-aminoacetonitrile (M.P. 101–102.5° C.) are similarly obtained, using water.

EXAMPLE 36

White needle crystals of N-(N-acetyl-phenylalanyl)-aminoacetonitrile (M.P. 188–189° C.) are similarly obtained, using water-ethanol.

EXAMPLE 37

White needle crystals of N-(N-acetyl-O-acetyl-tyrosyl)-aminoacetonitrile (M.P. 179–180° C.) are similarly obtained, using water.

EXAMPLE 38

White needle crystals of N-(N-acetyl-phenyl-glycyl)-aminoacetonitrile (M.P. 192–193° C.) are similarly obtained, using acetonitrile.

EXAMPLE 39

White leaflet crystals of N-(N-acetyl-δ-aminovaleryl)-aminoacetonitrile (M.P. 101° C.) are similarly obtained, using ethyl acetate.

What is claimed is:
1. N-(N-acylaminoacyl)-aminoacetonitrile of the formula

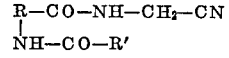

in which

is the radical of

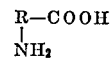

representing an amino acid selected from the group consisting of glycine, α-alanine, β-alanine, α-aminobutyric acid, γ-aminobutyric acid, α-aminoisobutyric acid, valine, leucine, isoleucine, norleucine, methionine, lysine, β-, α-, γ-, δ-, ε-aminocaproic acids, aspartic acid, phenylalanine, tyrosine, phenylglycine, δ-aminovaleric acid and O-acetyltyrosine, and R'CO represents an acyl radical, R' representing a member selected from the group consisting of phenyl and benzoylamino alkyl radicals, said alkyl having from 1 to 5 carbon atoms; with the proviso that where said amino acid is phenylalanine, tyrosine, phenylglycine or O-acetyltyrosine, said R' represents a member selected from the group consisting of phenyl, benzoylamino alkyl, said alkyl having from 1 to 5 carbon atoms, straight and branched chain alkyl having from 1 to 3 carbon atoms.
2. N-(N-benzoyl-glycyl)-aminoacetonitrile.
3. N-(N-benzoyl-valyl)-aminoacetonitrile.
4. N-(N-benzoyl-leucyl)-aminoacetonitrile.
5. N-(N-benzoyl-α-alanyl)-aminoacetonitrile.
6. N-[N,N-benzoyl-β-amino-caproyl)-glycyl]-aminoacetonitrile.
7. N-(N-benzoyl-alanyl)-aminoacetonitrile.
8. N-(N-acetyl-phenylalanyl)-aminoacetonitrile.
9. N-(N-acetyl-O-acetyl-tyrosyl)-aminoacetonitrile.
10. N-(N-acetyl-phenyl-glycyl)-aminoacetonitrile.

References Cited

FOREIGN PATENTS 1,073,288   6/1967   Great Britain.

JOSEPH P. BRUST, Primary Examiner

S. T. LAWRENCE III, Assistant Examiner

U.S. Cl. X.R.

260—326, 326.14, 404.5, 465.4; 424—274, 304